US012612257B2

(12) United States Patent
Audoy

(10) Patent No.: US 12,612,257 B2
(45) Date of Patent: Apr. 28, 2026

(54) MUSHROOM CONVEYING AND PACKAGING

(71) Applicant: CABANE & CIE, Parentis-en-Born (FR)

(72) Inventor: Vincent Audoy, Lue (FR)

(73) Assignee: CABANE & CIE, Parentis-en-Born (FR)

( * ) Notice: Subject to any disclaimer, the term of this patent is extended or adjusted under 35 U.S.C. 154(b) by 0 days.

(21) Appl. No.: 18/757,960

(22) Filed: Jun. 28, 2024

(65) Prior Publication Data

US 2025/0002257 A1 Jan. 2, 2025

(30) Foreign Application Priority Data

Jun. 30, 2023 (EP) ..................................... 23306099

(51) Int. Cl.
| | |
|---|---|
| *B65G 17/00* | (2006.01) |
| *B65B 5/08* | (2006.01) |
| *B65B 5/10* | (2006.01) |
| *B65B 35/38* | (2006.01) |
| *B65B 59/00* | (2006.01) |
| *A01G 18/70* | (2018.01) |
| *B65B 25/04* | (2006.01) |
| *B65B 35/24* | (2006.01) |

(52) U.S. Cl.
CPC .............. *B65G 17/002* (2013.01); *B65B 5/08* (2013.01); *B65B 5/105* (2013.01); *B65B 35/38* (2013.01); *B65B 59/001* (2019.05); *A01G 18/70* (2018.02); *B65B 25/04* (2013.01); *B65B*

*35/24* (2013.01); *B65G 2201/0202* (2013.01); *B65G 2201/0258* (2013.01)

(58) Field of Classification Search
CPC ........ B65G 17/00; B65G 17/002; B65B 5/08; B65B 5/105; B65B 35/38
See application file for complete search history.

(56) References Cited

U.S. PATENT DOCUMENTS

| | | | | |
|---|---|---|---|---|
| 4,957,619 A | * | 9/1990 | Powell, Jr. ................ | B07C 5/18 |
| | | | | 209/912 |
| 5,081,920 A | | 1/1992 | Kühlmann | |
| 5,535,875 A | | 7/1996 | Russell | |
| 5,878,863 A | * | 3/1999 | Madden ............... | B65G 47/965 |
| | | | | 209/912 |
| 6,374,983 B1 | * | 4/2002 | Morigi ................. | B65G 47/965 |
| | | | | 198/370.07 |

(Continued)

FOREIGN PATENT DOCUMENTS

| | | | | |
|---|---|---|---|---|
| CN | 113940238 A | | 1/2022 | |
| EP | 644120 A1 | * | 9/1994 | ............. B65B 25/04 |

(Continued)

OTHER PUBLICATIONS

Extended European Search Report for EP Application No. 23306099.5 dated Dec. 1, 2023, 37 pages.

*Primary Examiner* — Joshua G Kotis
(74) *Attorney, Agent, or Firm* — Seed Intellectual Property Law Group LLP

(57) ABSTRACT

Some examples show a conveying device for conveying an individual mushroom, a system adapted to convey mushrooms which comprises a plurality of conveying devices for conveying individual mushrooms, a method for conveying a mushroom, and a use of a conveyor to convey mushrooms.

7 Claims, 5 Drawing Sheets

(56) References Cited

U.S. PATENT DOCUMENTS

| | | | | |
|---|---|---|---|---|
| 10,596,707 | B2 * | 3/2020 | Katagiri | B25J 9/0093 |
| 2004/0099467 | A1 * | 5/2004 | Doake | B65B 25/04 |
| | | | | 180/400 |
| 2006/0042910 | A1 * | 3/2006 | Madden | B07C 5/36 |
| | | | | 198/370.07 |
| 2009/0026119 | A1 * | 1/2009 | Helgi | A22C 25/04 |
| | | | | 700/223 |
| 2011/0036061 | A1 * | 2/2011 | De Vos | B65B 25/04 |
| | | | | 53/502 |
| 2012/0228094 | A1 | 9/2012 | Öhman | |
| 2018/0100758 | A1 * | 4/2018 | Blanc | B65G 17/12 |
| 2018/0257109 | A1 * | 9/2018 | Benedetti | B07C 5/3422 |
| 2020/0170201 | A1 | 6/2020 | Delbeke et al. | |
| 2020/0404845 | A1 * | 12/2020 | Good | A01D 45/00 |
| 2023/0120423 | A1 * | 4/2023 | Doake | A01G 18/70 |
| | | | | 47/1.1 |
| 2024/0034574 | A1 * | 2/2024 | Lemmen | B65G 21/10 |
| 2024/0217687 | A1 * | 7/2024 | Gardiner | A23N 15/045 |

FOREIGN PATENT DOCUMENTS

| | | | | | |
|---|---|---|---|---|---|
| EP | 0 894 441 | A1 | | 2/1999 | |
| EP | 1344577 | A1 * | 9/2003 | | B65G 47/967 |
| EP | 1867589 | A1 * | 12/2007 | | B65G 47/962 |
| EP | 3 815 518 | A2 | | 5/2021 | |
| GB | 2 270 296 | A | | 3/1994 | |
| JP | 2003-235349 | A | | 8/2003 | |
| WO | WO-0133981 | A1 * | 5/2001 | | A23N 15/045 |
| WO | WO-03092354 | A1 * | 11/2003 | | A01G 18/70 |
| WO | 2010/140888 | A2 | | 12/2010 | |
| WO | WO-2018172376 | A1 * | 9/2018 | | B65G 47/842 |
| WO | WO-2021250185 | A1 * | 12/2021 | | B65G 17/323 |
| WO | 2022031171 | A1 | | 2/2022 | |

* cited by examiner

1000

Placing a mushroom in the chamber of an individual conveying device — 1100

Positioning the individual conveying device for a mushroom on a conveyor belt of a conveyor — 1200

Conveying the individual conveying device for a mushroom on the conveyor belt of the conveyor — 1300

MUSHROOM CONVEYING AND PACKAGING

BACKGROUND

Technical Field

This disclosure concerns the field of mushroom conveying and packaging.

Description of the Related Art

Mushrooms must be transported from growth chambers to a packaging area in order to be packaged for commercial sale. The techniques used for transporting and packaging mushrooms are at least partly based on manual labor, which does not always preserve the quality of the products, and which has the disadvantage of being relatively slow.

This disclosure at least partly improves this situation.

BRIEF SUMMARY

In this regard, an individual conveying device is proposed for the individual conveying of a mushroom, comprising a conveying body having a chamber intended to at least partially accommodate the mushroom;

wherein the conveying body comprises an upper surface and a lower surface opposite the upper surface;

the lower surface of the conveying body being configured to come into contact with a conveyor belt of a conveyor so as to allow the device to be carried along in order to provide individual conveying of the mushroom by friction;

the upper surface of the conveying body comprising an orifice enabling insertion of the mushroom into the chamber, wherein an edge of the orifice defines an upper end of the chamber;

the chamber comprising an upper portion extending from the orifice of the upper surface of the conveying body towards the lower surface of the conveying body and being shaped to at least partially accommodate a cap of the mushroom; and the chamber comprising a lower portion extending from the upper portion of the chamber towards the lower surface of the conveying body and being shaped to accommodate a mushroom stem.

Optionally, the upper portion of the chamber may have the shape of a truncated cone where the end having the smallest diameter is positioned opposite the orifice of the upper surface of the conveying body, and the lower portion of the chamber extends from the truncated cone towards the lower surface of the conveying body. In this option, a distance between the ends of the truncated cone of the upper portion of the chamber of the conveying body, along the axis of revolution of the truncated cone, may be between 20 and 50 millimeters; a maximum diameter of the truncated cone may be between 90 and 110 millimeters; and a minimum diameter of the truncated cone may be between 12 and 32 millimeters.

Optionally, the lower portion of the chamber may have a circular cylindrical shape. In this option, a distance between the ends of the cylindrical shape of the lower portion of the chamber of the conveying body, along the axis of revolution of the cylindrical shape, may be between 40 and 80 millimeters; and a diameter of the cylindrical shape may be between 12 and 32 millimeters.

Optionally, the conveying body has a circular cylindrical shape externally.

The present disclosure further presents a system adapted to convey mushrooms, comprising:

a first conveyor having a conveyor belt adapted to transport mushrooms between a loading zone for loading the mushrooms into individual conveying devices according to any of the examples described in the present disclosure and an unloading zone for unloading the mushrooms into packaging devices;

a plurality of individual conveying devices for a mushroom according to any of the examples described in the present disclosure; and a cooling device positioned between the loading zone and the unloading zone and adapted to cool the mushrooms when they are respectively positioned in their individual conveying device.

Optionally, the system may also be adapted to package mushrooms.

The system may thus comprise a filling device configured to fill packaging devices with mushrooms, the filling device comprising a first packaging gripper robot adapted to grasp a mushroom from an individual conveying device for a mushroom then to position this mushroom in a packaging device.

Optionally, the filling device may also comprise a multihead weigher and a second packaging gripper robot.

The multihead weigher may comprise a plurality of scales. Each scale of the plurality of scales may be configured for respectively weighing a mushroom when this mushroom is positioned in its individual conveying device.

The multihead weigher may also be configured for selecting a sub-plurality of mushrooms among the plurality of mushrooms weighed by the plurality of scales in order to fill a specific packaging device.

The second packaging gripper robot may be adapted to grasp the sub-plurality of mushrooms selected by the multihead weigher and to deposit this sub-plurality in the specific packaging device.

Optionally, the second packaging gripper robot may have a sub-plurality of pneumatic suction cups adapted to grasp the sub-plurality of mushrooms by their cap when they are positioned in their individual conveying device. In this option, the second gripper robot may also be configured to deposit the grasped sub-plurality of mushrooms in the packaging device so that the caps of the mushrooms are oriented substantially towards the direction opposite to the bottom of the specific packaging device.

Optionally, the system adapted to convey mushrooms may further comprise:

a second conveyor adapted to transport mushrooms from a mushroom growth chamber to the loading zone of the first conveyor;

a positioning gripper robot adapted to grasp a mushroom transported by the second conveyor and to position this mushroom in an individual conveying device positioned on the first conveyor; and a camera configured for selecting mushrooms to be grasped by the positioning gripper robot, the selection being made based on at least one among a shape and a color of the cap of the mushrooms.

In this option, the first conveyor may comprise a plurality of conveyor belts, at least some of the belts being associated with a mushroom size interval; the camera may also be configured for determining the sizes of mushrooms; and the system may further comprise a guide element configured to guide an individual conveying device for a mushroom that holds a mushroom of a specific size determined by the camera, towards a conveyor belt of the first conveyor associated with a size interval that includes the specific size.

Optionally, the second conveyor is a belt conveyor comprising a belt having orifices, each orifice making it possible to accommodate a mushroom by inserting the mushroom into the orifice via its stem.

The application also relates to a method for conveying a mushroom, comprising:

placing a mushroom in the chamber of an individual conveying device for a mushroom according to any of the examples described in the present disclosure;

positioning the individual conveying device for a mushroom on a conveyor belt of a conveyor; and conveying the individual conveying device for a mushroom on the conveyor belt of the conveyor.

Optionally, the placing of a mushroom in the chamber of the individual conveying device for a mushroom is carried out by a gripper robot.

The application further relates to the use of a conveyor to convey mushrooms, each mushroom being conveyed individually by an individual conveying device for a mushroom according to any of the examples described in the present disclosure.

The present disclosure therefore proposes an individual conveying device for a mushroom providing stable, safe and rapid conveying, which allows preserving the quality of the mushroom while it is being conveyed. This device may be part of an automated system, reducing human intervention in the mushroom processing chain, which in particular is intended to cool the mushrooms while they are being conveyed, in particular in order to slow down the enzymatic reactions they will undergo once their conveying begins. This cooling performed upstream of their packaging also makes it possible to package the mushrooms when they have a reduced weight, which reduces the energy required for the gripper robots to grasp and position them in the packaging devices, which allows precise control over the filling of packaging devices by weight, and which also allows reducing or even eliminating deterioration of the packaging devices due to moisture generated by certain cooling devices in order to cool the mushrooms.

BRIEF DESCRIPTION OF THE SEVERAL VIEWS OF THE DRAWINGS

Other features, details, and advantages will become apparent upon reading the detailed description below, and upon analyzing the appended drawings, in which.

4

Figure 8:
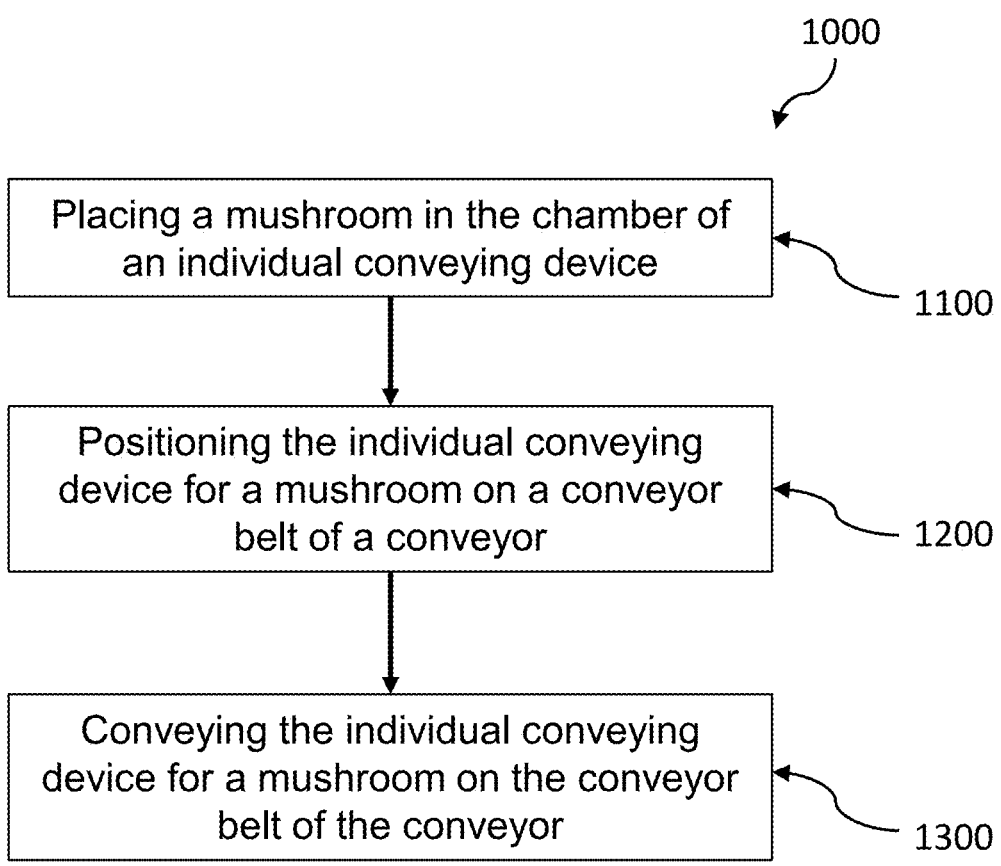

FIG. 8 schematically represents an example of a method for conveying mushrooms.

DETAILED DESCRIPTION

An example of an individual conveying device 1 for a mushroom is now described with reference to FIG. 1. Individual conveying device 1 for a mushroom according to the present disclosure is such that it allows conveying a mushroom individually, while protecting the mushroom in an effective manner so that the mushroom can be moved along quickly. Furthermore, the presented device allows easier handling of the mushroom by automatic means, such as gripper robots, which allows reducing the use of manual labor in mushroom conveying and packaging operations.

The individual conveying device 1 for a mushroom according to the present disclosure corresponds to a holder for transporting an individual mushroom via a conveyor. The individual conveying device 1 may, for example, correspond to an individual conveying puck, sometimes also referred to as a product carrier or a transport cup. "Puck" designates devices for the individual conveying of fragile products on production lines, particularly in the pharmaceutical or perfume industry.

Thus, the individual conveying device 1 for a mushroom comprises a conveying body 2 having a chamber 3 intended to at least partially accommodate the mushroom. The conveying body 2 comprises an upper surface 2s and a lower surface 2i. The lower surface 2i is opposite upper surface 2s. The lower surface 2i of conveying body 2 is intended to come into contact with a conveyor belt of a conveyor so as to allow carrying along individual conveying device 1 for a mushroom, by friction. Consequently, the upper surface 2s of the conveying body 2 is intended to be oriented upwards when the individual conveying device 1 for the mushroom is appropriately positioned on a conveyor.

The upper surface 2s of conveying body 2 comprises an orifice 4 enabling insertion of the mushroom into the chamber 3. The edge of orifice 4 therefore defines an upper end of the chamber 3.

The chamber 3 comprises an upper portion 3s shaped to at least partially accommodate a cap of the mushroom. The upper portion 3s of the chamber 3 extends from the orifice 4 of the upper surface 2s towards the lower surface 2i of conveying body 2 of the individual conveying device 1 for the mushroom.

The chamber 3 also comprises a lower portion 3i shaped to accommodate a mushroom stem. The lower portion 3i of chamber 3 extends from the upper portion of chamber 3s towards the lower surface 2i of conveying body 2.

In some examples, the lower portion 3i of the chamber 3 may have a length at least equal to the length of the mushroom stem it accommodates. The lower portion 3i of the chamber may, for example, have a length at least 1% greater than the length of the stem of the mushroom it accommodates, and may advantageously have a length at least 3% greater than the length of the stem. The length of the lower portion 3i of the chamber may, for example, be defined as a distance between the upper portion 3s of the chamber and a surface opposite the upper part of the chamber, towards the lower surface 2i of the conveying body, delimiting or defining an end of the chamber. The surface opposite the upper part 3s of the chamber may, for example, correspond to the lower surface 2i of the conveying body. In this case, the chamber 3 extends from the edge of the upper surface 2s of the conveying body 2 to the lower surface 2i of the conveying body 2. These examples allow for the conveying of the mushroom in the conveying device without having to cut its stem beforehand, while ensuring the protection of the integrity of the stem during conveyance.

In some examples, the upper portion 3s of chamber 3 may have the shape of a truncated cone where the end having the smallest diameter is positioned opposite orifice 4 of the upper surface of 2s of the conveying body. In this case, a truncated cone, by definition, comprises a first end having a larger diameter than a second end. Furthermore, in the examples in which upper portion 3s of the chamber 3 may have the shape of a truncated cone, the lower portion 3i of chamber 3 may extend from the truncated cone of the upper portion 3s of the chamber 3 towards the lower surface 2i of the conveying body 2. In these examples, the upper portion 3s of chamber 3 thus has a shape at least partially matching the shape of a mushroom cap, thus improving the protection and retention of the mushroom in the chamber during its conveying, which makes it possible to increase the speed at which the mushroom is moved as it is conveyed. In particular, in the event of a collision of the individual conveying device for a mushroom during its movement, the truncated-cone shape of the upper portion of the chamber will help retain the mushroom in conveying device 1.

In the examples in which the upper portion 3s of the chamber 3 has a truncated-cone shape, the upper portion 3s of chamber 3 may have the following characteristics:

a distance separating the ends of the truncated cone along the axis of revolution of the truncated cone is between 20 and 50 millimeters;

a maximum diameter of the truncated cone is between 90 and 110 millimeters; and a minimum diameter of the truncated cone is between 12 and 32 millimeters.

These characteristics correspond to dimensions of the upper portion 3s of chamber 3 which allow using a reduced amount of material, thus reducing the manufacturing cost of the device, while allowing almost all sizes of button mushroom caps to be accommodated. These examples are therefore particularly suitable for the conveying of a button mushroom and in particular for protecting and retaining its cap while it is conveyed.

In some examples, the lower portion 3i of chamber 3 may have a circular cylindrical shape, meaning the shape of a cylinder where the base has the shape of a circle. In these examples, the lower portion 3i of chamber 3 thus has a shape which at least partially surrounds the shape of a mushroom stem, thereby improving the protection and retention of the mushroom in the chamber during its conveying, which may allow increasing the speed at which the mushroom is moved during its conveying. For example, in the event of a collision of the individual conveyance device for the mushroom during its movement, the circular cylindrical shape of the lower portion of the chamber will help retain the mushroom in conveying device 1. As previously explained, the length of the lower portion 3i of the chamber, which in these examples can be defined as a distance between the two bases of the cylinder of the circular cylindrical shape, may have a length at least equal to the length of the stem of the mushroom it accommodates. In other words, the circular cylindrical shape of the lower portion 3i of the chamber can encompass the stem of the mushroom along its entire length (and possibly extend beyond it). These examples allow for the conveying of the mushroom in the conveying device without having to cut its stem beforehand, while ensuring the protection of the integrity of the stem during conveyance.

In the examples in which the lower portion 3i of chamber 3 has a circular cylindrical shape, the lower portion 3i of chamber 3 may have the following characteristics:

a distance separating the ends of the cylinder along the axis of revolution of the cylinder is between 40 and 80 millimeters; and a diameter of the cylinder, i.e., of its circular base, is between 12 and 32 millimeters.

These characteristics correspond to dimensions of lower portion 3i of chamber 3 which allow using a reduced amount of material, thus reducing the manufacturing cost of the device, while making it possible to accommodate almost all sizes of button mushroom stems. These examples are therefore particularly suitable for the conveying of a button mushroom and in particular for protecting and retaining its stem while it is being conveyed. These dimensions allow protecting and retaining the mushroom stem during its conveyance, thus eliminating the need to cut the stem for such conveyance.

Figures 1, 2:
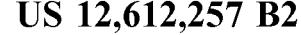
FIG. 1 schematically represents an example of an individual conveying device for a mushroom.
FIG. 2 schematically represents a section view of an example of an individual conveying device for a mushroom.
Figure 3:
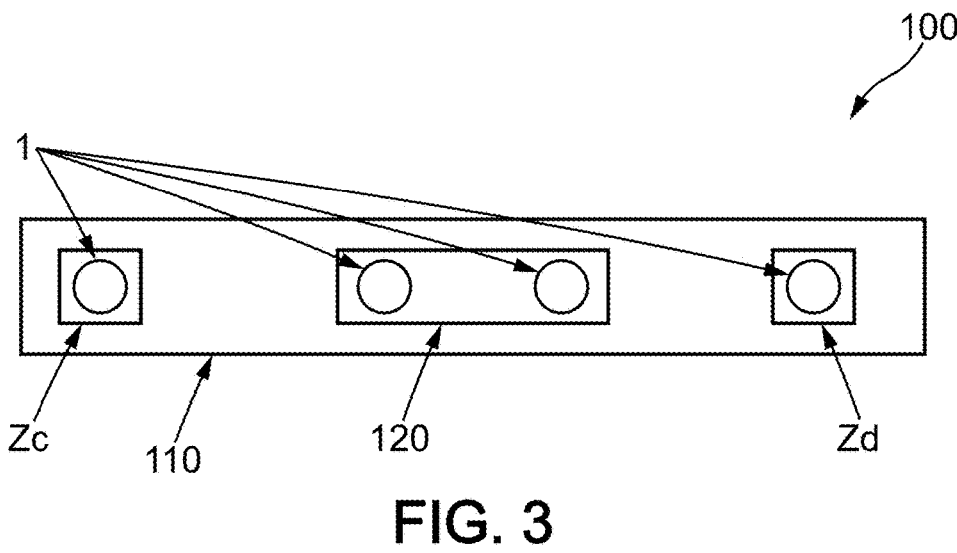
FIG. 3 schematically represents an example of a system adapted to convey mushrooms in individual conveying devices.

An example of individual conveying device 1 for a mushroom comprising a conveying body 2 and a chamber 3, having:

an upper portion 3s that has the shape of a truncated cone where the end having the smallest diameter is positioned opposite the orifice of the upper surface of the conveying body; and a lower portion 3i extending from the truncated cone towards lower surface 2i of conveying body 2 and having a circular cylindrical shape;

is shown in cross-section in FIG. 2, along a plane which comprises the axis of revolution of the cylinder.

In some examples, the external shape of conveying body 2 is a circular cylinder. This external shape of conveying body 2 of individual conveying device 1 for a mushroom makes it possible to protect the mushroom while it is being conveyed, in the event of impacts, and therefore makes it possible to increase the speed at which the mushroom is moved along while being conveyed. Indeed, such an external shape allows effective shock absorption, particularly in the event of a collision with another device of this type, or in the event of a collision with a surface of the conveyor during the conveying. These examples may therefore allow increasing the speed of movement of the mushroom while it is being conveyed, while maintaining a reasonable risk of mushroom quality loss in the event of impacts.

The examples of conveying device 1 for conveying a mushroom according to the present disclosure therefore allow safe conveying of the mushroom, meaning a conveying which preserves the quality of the mushroom, particularly in the event of collisions with surfaces of the conveyor or with other devices for conveying mushrooms. Furthermore, the device according to the present disclosure also allows stable and rapid conveying of the mushroom as long as the mushroom is well protected while it is being conveyed. Conveying device 1 according to the present disclosure therefore makes it possible to increase the speed of the process of industrially processing mushrooms in a mushroom production factory. It should also be noted that the positioning of the mushroom in conveying device 1 according to the present disclosure allows it to be grasped directly, for example by a gripper robot, from its conveying device, in a position where the cap is at the top and the stem is at the bottom. This position is a commercially advantageous position for packaging the mushroom. Indeed, the positioning of mushrooms in the packaging devices in which the mushrooms are sold, for example punnets, is important on a commercial level, and a mushroom consumer will more readily buy a punnet of mushrooms when the mushrooms visible in the punnet of mushrooms are presented with the cap on top and the stem underneath. Consequently, the fact that the mushroom has such a position in its conveying device allows eliminating other subsequent manipulations of the mushroom at the time of its packaging in order to achieve the commercially preferred position, and in particular allows the use of gripper robots with suction cups for grasping the mushroom, as explained below.

With reference to FIGS. 3, 4, 6, and 7, examples of systems 100 adapted to convey mushrooms in individual conveying devices for mushrooms are now presented. In certain examples, in particular those shown in FIGS. 4, 6, and 7, systems 100 may also be adapted to package mushrooms.

System 100 may comprise a first conveyor 110. The first conveyor 110 has a conveyor belt (not shown) adapted to transport mushrooms in individual conveying devices 1 for a mushroom according to the present disclosure, between a loading zone Zc and an unloading zone Zd. In some examples, the first conveyor 110 is a chain conveyor, meaning a conveyor having a conveyor belt driven by a chain, for example a chain made of synthetic material.

As explained above, the individual conveying devices for a mushroom are for example transported between loading zone Zc and unloading zone Zd by friction between lower surface 2i of conveying body 2 and the corresponding surface of the conveyor belt that is in contact with lower surface 2i.

The loading zone Zc designates an area of first conveyor 110 where the mushrooms are individually positioned in a conveying device 1 of the present disclosure. The unloading zone Zd designates an area of first conveyor 110 where the mushrooms are removed from conveying device 1 in order to be positioned in packaging devices.

System 100 may also comprise a plurality of individual conveying devices 1 for a mushroom according to any of the examples of this type of device that are described in the present disclosure. Some examples of devices 1 have in particular been described above with reference to FIGS. 1 and 2.

System 100 may comprise a cooling device 120 positioned between the loading zone Zc and the unloading zone Zd of the first conveyor 110. The cooling device 120 is adapted to cool the mushrooms when they are positioned in their respective individual conveying device 1, during their transport between loading zone Zc and unloading zone Zd of the first conveyor 1pa10. In some examples, cooling device 120 may comprise a refrigerator and a fan, the fan being oriented to blow air, cooled by the refrigerator, onto individual conveying devices 1 for mushrooms during their transport.

Conveying system 100 according to the present disclosure makes it possible to convey mushrooms quickly, stably, and safely between a loading zone and an unloading zone of a conveyor, using individual conveying devices 1 for a mushroom as presented by the present disclosure.

Furthermore, positioning the cooling device between the loading zone and the unloading zone of the conveyor allows cooling the mushrooms relatively early in the industrial process of processing mushrooms for commercial sale, which makes it possible to preserve their quality longer by slowing down the enzymatic reactions which they will undergo. In particular, the mushrooms are cooled before being placed in packaging devices. Cooling the mushrooms causes some loss of weight by the mushrooms, so cooling the mushrooms after their placement in packaging devices leads to a reduction in the weight of the packaging devices. However, for a mushroom packaging device to be sellable, it must reach a minimum target weight. Cooling the mushrooms before their packaging therefore makes it possible to control the filling of the packaging devices so that this target weight is reached directly rather than having to correct, later on, a loss of weight in the packaging devices due to cooling the mushrooms, which for example cause certain packaging devices to fall below the required target weight. Furthermore, it is not a satisfactory solution to overload the mushroom packaging devices early on, in anticipation of the mushrooms losing weight due to cooling, as the control over the weight of the packaging devices will remain significantly less precise than when performed directly by filling the packaging devices with cooled mushrooms. Finally, it should also be noted that when the packaging devices are packaging devices that are sensitive to moisture, for example when cardboard punnets are concerned, the packaging devices absorb the moisture emitted by the mushroom cooling devices, which may cause them to deteriorate. Cooling the mushrooms before packaging therefore makes it possible to use moisture-sensitive packaging devices while reducing or even eliminating the deterioration of these packaging devices caused by moisture.

Figure 4:
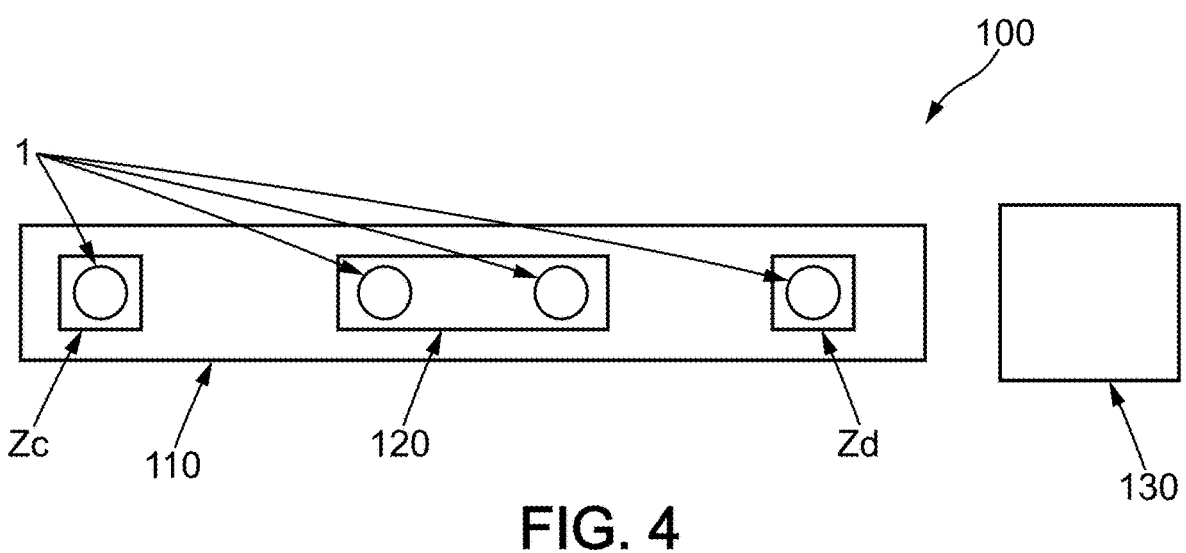
FIG. 4 schematically represents a first example of a system adapted to convey and package mushrooms.

In some examples, system 100 may comprise a filling device 130 configured to fill packaging devices with mushrooms. Such an example of system 100 is schematically represented in FIG. 4.

The filling device 130 may comprise a first packaging gripper robot 131 adapted to grasp a mushroom from an individual conveying device for a mushroom and then to position the mushroom in a packaging device.

A gripper robot corresponds to a robot capable of grasping one or more items at a first position and placing this or these items at a second position. This type of robot is generally referred to by the term "pick and place robot." Mention is made in this disclosure of "positioning gripper robot" and "packaging gripper robot." These two terms are simply used as labels to distinguish where the gripper robot intervenes in the mushroom processing chain. However, these two names functionally designate the same type of device, i.e., a pick and place robot.

A packaging device for mushrooms may in particular correspond to a punnet, for example made of synthetic material or cardboard, to a tray for the sale of mushrooms in bulk, or to a bag, for example a plastic bag or kraft paper bag.

In some examples, filling device 130 may comprise a multihead weigher 132. A multihead weigher refers to a device used to weigh products for the purpose of grouping or combining them based on their weight.

In some examples, multihead weigher 132 may comprise a plurality of scales 132b. Each scale 132b of the plurality of scales 132b may be configured for respectively weighing a mushroom when the mushroom is positioned in its individual conveying device. In this respect, individual conveying devices for mushrooms may be transported by first conveyor 110 to the plurality of scales 132b and positioned so as to be weighed individually by a scale 132b. By subtracting the weight of individual conveying device 1 for a mushroom from the measured weight, the scale may therefore determine the weight of the mushroom positioned in conveying device 1. The multihead weigher 132 may also be configured for selecting a sub-plurality of mushrooms among the plurality of mushrooms weighed by the plurality of scales, in order to fill a specific packaging device.

In some examples in which packaging device 130 comprises multihead weigher 132, the packaging device 130 may further comprise a second packaging gripper robot 133. Second packaging gripper robot 133 may be adapted to grasp the sub-plurality of mushrooms selected by multihead weigher 132 and to deposit the selected sub-plurality of mushrooms in the specific packaging device.

Figure 5:
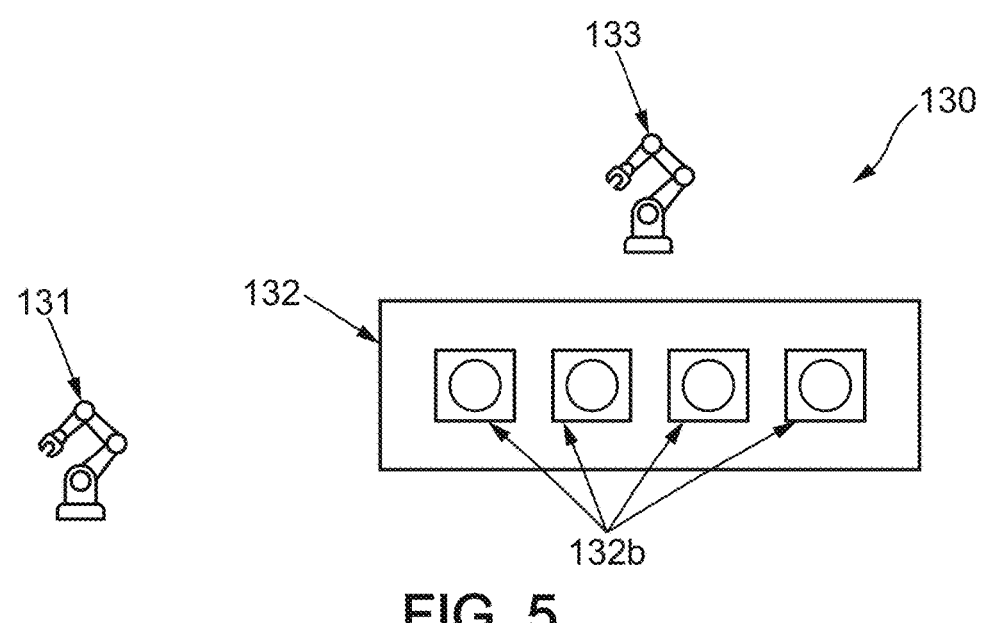
FIG. 5 schematically represents an example of a packaging device.

A filling device 130 comprising the first packaging gripper robot 131, the multihead weigher 132 and the second packaging gripper robot 133 is schematically represented in FIG. 5.

Thus, in examples in which the filling device 130 comprises the first packaging gripper robot 131, the multihead weigher 132 and the second packaging gripper robot 133, the filling of a specific packaging device so that it reaches a predetermined target weight may be done in the following manner. Firstly, the first packaging gripper robot 131 positions a predetermined number of mushrooms in the specific packaging device. This involves executing a first filling of the specific packaging device which is not precisely focused on the final weight of the packaging device. In particular, the number of mushrooms positioned by the first packaging gripper robot 131 in the specific packaging device may be predetermined so as to ensure that the combined weight of these mushrooms is always strictly less than the predetermined target weight of the packaging device once filled. In a second step, the multihead weigher 132 selects a sub-plurality of mushrooms among the plurality of mushrooms weighed by the plurality of scales 132b so that the specific packaging device, already partly pre-filled by the first gripper robot 131, reaches the predetermined target weight for commercial sale with the goal being to exceed it as little as possible. For the producer, each additional gram above the target weight corresponds to a financial loss since the packaging devices are sold assuming that they weigh the target weight, for example a weight of 250 grams or 500 grams for a punnet. Therefore, the multihead weigher chooses the best combination of mushrooms which, when added to the specific packaging device pre-filled by first packaging gripper robot 131, allows the specific packaging device to reach a weight greater than the predetermined target weight for commercial sale while remaining as close to that weight as possible. Finally, in a third step, second packaging gripper robot 133 is adapted to grasp the sub-plurality of mushrooms selected by multihead weigher 132 and to deposit the selected sub-plurality of mushrooms in the specific packaging device. In this manner, the filling of a packaging device may be carried out automatically and in an extremely precise manner.

In some examples, the second gripper robot 133 of packaging device 130 may have a sub-plurality of pneumatic suction cups adapted to grasp the sub-plurality of mushrooms by their cap when they are positioned in their individual conveying device. In this manner, second gripper robot 133 may be configured to deposit the sub-plurality of mushrooms in the packaging device so that the caps of the mushrooms are oriented substantially towards the direction opposite to the bottom of the specific packaging device, which means that the stems of the mushrooms, when they have not been cut beforehand, are oriented towards the bottom of the specific packaging device. As explained above, the position of the mushrooms in the packaging devices in which these mushrooms are sold is important commercially, in particular for punnets. A mushroom consumer will more easily buy a punnet of mushrooms when the mushrooms visible in the punnet of mushrooms are presented with the cap on top and the stem underneath. Here, where the sub-plurality of mushrooms grasped by second packaging gripper robot 133 will be brought to finish filling up the packaging device, the sub-plurality will be placed at the surface of the packaging device so these will probably be the products of the packaging device most visible to the consumer, among the products contained in the packaging device, and the configuration of second packaging gripper robot 133 therefore allows positioning the sub-plurality in the packaging device in a manner that is attractive for the consumer.

In some examples, system 100 may further comprise a second conveyor 140. The second conveyor 140 is adapted to transport mushrooms from a mushroom growth chamber (not shown) to the loading zone Zc of first conveyor 110. In some examples, the second conveyor 140 may be a belt conveyor. The belt conveyor comprises a belt having orifices. Each orifice accommodates a mushroom by insertion of the mushroom into the orifice via the stem. In this manner, mushroom pickers positioned in the growth chamber can insert the mushroom into an orifice in the belt, and these mushrooms are brought automatically to the first conveyor for placement in the individual conveying devices.

In some examples in which system 100 comprises second conveyor 140, the system 100 may also comprise a positioning gripper robot 150. Positioning gripper robot 150 is adapted to grasp a mushroom transported by second conveyor 140 and to position the mushroom in an individual conveying device positioned on first conveyor 110. Individual conveying device 1 for a mushroom is for example positioned in loading zone Zc of first conveyor 110 during this action. The positioning gripper robot 150 therefore makes it possible to position the mushrooms in their individual conveying device automatically. Therefore, system 100 allows automated processing of mushrooms, from second conveyor 140 in immediate proximity to the growth chamber, to packaging, thus reducing the need for human intervention along the mushroom processing chain, and therefore enabling increased output from the mushroom production plant.

Figure 6:
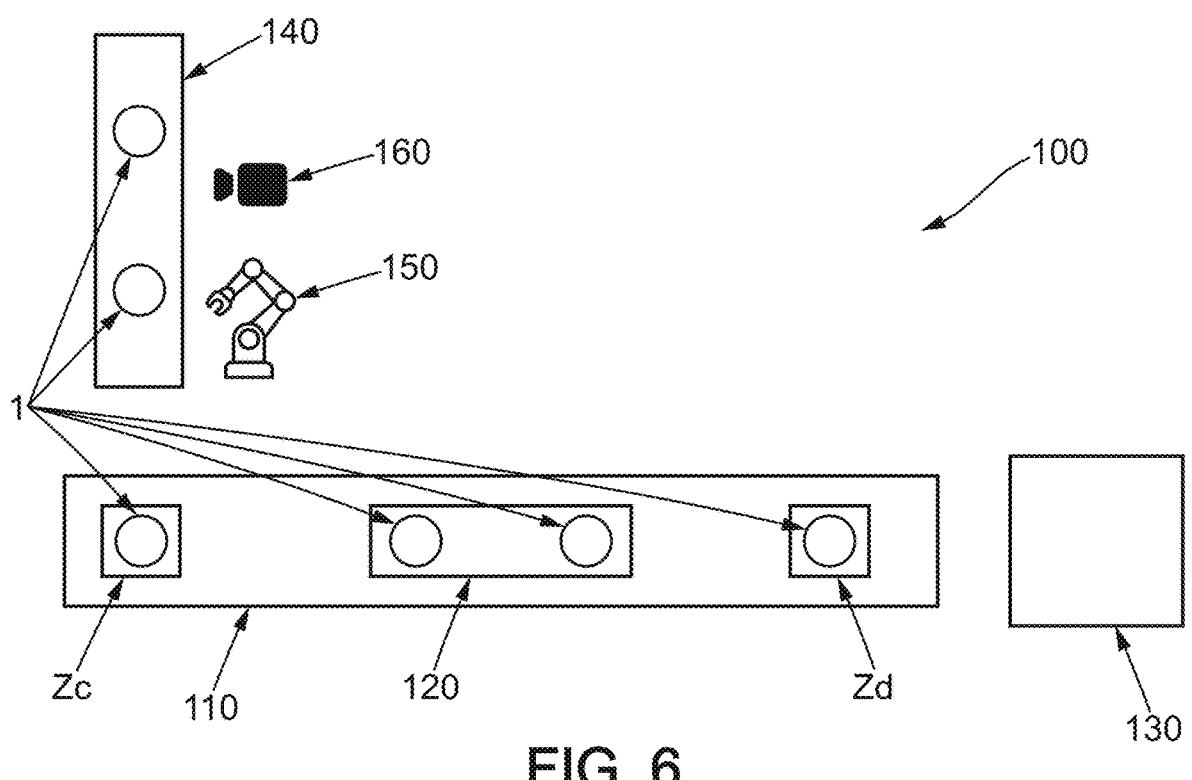
FIG. 6 schematically represents a second example of a system adapted to convey and package mushrooms.

In some examples where system 100 comprises the second conveyor 140 and the positioning gripper robot 150, the system 100 may also comprise a camera 160. Such an example of a system is schematically represented in FIG. 6.

The camera 160 is configured for selecting mushrooms to be grasped by the positioning gripper robot 150. The selection is made according to at least one among a shape and a color of the cap of the mushrooms. Among the mushrooms conveyed by the second conveyor 140, not all are necessarily consumable and/or sellable. The camera thus allows selecting the mushrooms to be packaged, which are placed on individual conveying devices 1 and are conveyed by first conveyor 110 to unloading zone Zd for packaging.

In some examples, the camera 160 selects a specific mushroom when at least one of the following conditions is satisfied:

the shape of the cap of the specific mushroom has a deviation of less than a predetermined threshold from a predefined shape; and pixels belonging to the cap of the specific mushroom are of a different color than the colors predefined as being non-selectable.

Colors predefined as non-selectable may, for example, comprise at least one among the color yellow and the color black. These are colors indicating that the quality of the mushroom will not allow it to be consumed and/or commercially sold.

Figure 7:
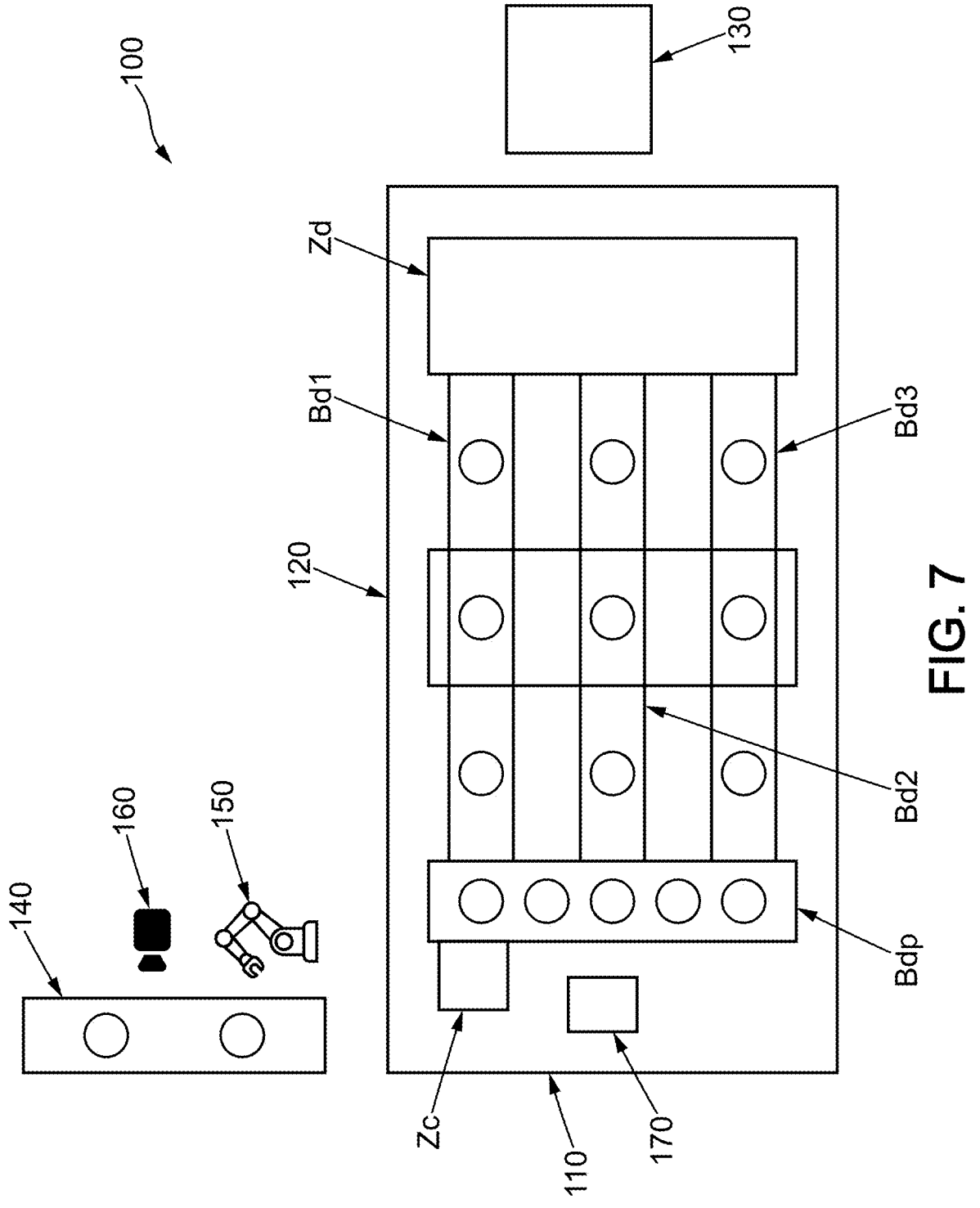
FIG. 7 schematically represents a third example of a system adapted to convey and package mushrooms.

In some examples in which system 100 comprises the second conveyor 140, the positioning gripper robot 150 and the camera 160, the first conveyor 110 may comprise a plurality of conveyor belts and system 100 may further comprise a guide element 170. Such an example of a system is schematically represented in FIG. 7. In this figure, the plurality of conveyor belts consists, for illustrative purposes only, of three conveyor belts denoted Bd1, Bd2 and Bd3. In these examples, at least some of the belts among the plurality of conveyor belts may be associated with a mushroom size interval. Camera 160 may thus be configured to determine the sizes of the mushrooms. The guide element 170 is then configured to guide an individual conveying device for a mushroom, which is holding a mushroom of a specific size determined by the camera, towards a conveyor belt Bd of first conveyor 110 associated with a size interval that includes the specific size. In the current case, these example systems 100 allow guiding the individual conveying devices for mushrooms towards conveyor belts which are associated with the sizes of the mushroom which they are holding. As a result, differentiated processing may be carried out according to the size of the mushroom, particularly in packaging the mushroom. For example, depending on the size of the mushroom, the packaging device in which the mushroom will be positioned after conveying may be different, so that individual conveying devices for mushrooms of different sizes are for example conveyed to different portions of unloading zone Zd of the first conveyor 110, which is made possible by the use of several conveyor belts. In some examples, the first conveyor 110 may comprise a shared conveyor belt, from which the individual conveying devices for mushrooms are guided towards the conveyor belt respectively associated with the size of the mushroom each contains. The shared conveyor belt is denoted Bdp in FIG. 7. The shared conveyor belt may, for example, be in communication with loading zone Zc where the mushrooms can be positioned, via positioning gripper robot 150, in individual conveying devices 1.

With reference to FIG. 8, an example of a method 1000 for conveying a mushroom is now presented.

As illustrated in FIG. 8, the method 1000 comprises an operation 1100 of placing a mushroom in the chamber of an individual conveying device 1 for a mushroom according to any one of the examples of this type of device described in the present disclosure. In some examples, the mushroom is placed in the chamber of an individual conveying device 1 for a mushroom by means of a gripper robot.

As illustrated in FIG. 8, the method 1000 comprises an operation 1200 of positioning the individual conveying device for a mushroom on a conveyor belt of a conveyor.

As illustrated in FIG. 8, the method 1000 comprises an operation 1300 of conveying the individual conveying device for a mushroom on the conveyor belt of the conveyor.

The present disclosure also relates to the use of a conveyor, for example a chain conveyor, to convey mushrooms, wherein each mushroom is conveyed individually via any of the examples of this type of device described in the present disclosure.

The present disclosure therefore proposes an individual conveying device for a mushroom that is stable, safe, and rapid, which allows preserving the quality of the mushroom during its conveying. The device may be part of an automated system, reducing human intervention in the mushroom processing chain, which in particular is intended to cool the mushrooms while they are being conveyed, in particular in order to slow down the enzymatic reactions they will undergo once their conveying begins. This cooling, performed upstream of their packaging, also makes it possible to package the mushrooms when they have a reduced weight, which reduces the energy required for the gripper robots to grasp and position them in the packaging devices, which allows precise control over the filling of packaging devices by weight, and which allows reducing or even eliminating deterioration of the packaging devices due to moisture generated by certain cooling devices in order to cool the mushrooms.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled.

The invention claimed is:

1. A system adapted to convey mushrooms, comprising:
   a plurality of conveying devices for conveying individual mushrooms;
   a first conveyor having a conveyor belt adapted to transport mushrooms between a loading zone for loading the mushrooms into respective conveying devices of the plurality of conveying devices and an unloading zone for unloading the mushrooms into packaging devices;
   a filling device configured to fill packaging devices with mushrooms;
   the filling device comprising a first packaging gripper robot adapted to grasp a mushroom from a conveying device of the plurality of conveying devices and then to position the mushroom in a packaging device of the packaging devices;
   wherein the filling device further comprises a multihead weigher and a second packaging gripper robot, the multihead weigher comprising a plurality of scales;
   each scale of the plurality of scales being configured for respectively weighing a mushroom when the mushroom is positioned in its respective conveying device;
   the multihead weigher being configured for selecting a sub-plurality of mushrooms among a plurality of mushrooms weighed by the plurality of scales in order to fill a specific packaging device; and
   the second packaging gripper robot being adapted to grasp the selected sub-plurality of mushrooms and to deposit the sub-plurality of mushrooms in the specific packaging device;
   wherein a conveying device of the plurality of conveying devices for conveying an individual mushroom comprises:
      a conveying body having a chamber intended to at least partially accommodate the mushroom, wherein the conveying body comprises an upper surface and a lower surface opposed to the upper surface;
      the lower surface of the conveying body being configured to come into contact with the conveyor belt of the first conveyor so as to allow the conveying device of the plurality of conveying devices to be carried along by friction in order to provide individual conveying of the mushroom;
      the upper surface of the conveying body comprising an orifice enabling insertion of the mushroom into the chamber, wherein an edge of the orifice defines an upper end of the chamber;
      the chamber comprising an upper portion extending from the orifice of the upper surface of the conveying body towards the lower surface of the conveying body and being shaped to at least partially accommodate a cap of the mushroom; and the chamber comprising a lower portion extending from the upper portion of the chamber towards the lower surface of the conveying body and being shaped to accommodate a stem of the mushroom.

2. The system according to claim 1, wherein the second packaging gripper robot has a sub-plurality of pneumatic suction cups adapted to grasp the sub-plurality of mushrooms by their cap when the mushrooms are positioned in their respective conveying device, the second packaging gripper robot being configured to deposit the sub-plurality of mushrooms in the specific packaging device so that the caps of the mushrooms are oriented substantially towards the direction opposite to a bottom of the specific packaging device.

3. The system according to claim 1, further comprising a cooling device positioned between the loading zone and the unloading zone and adapted to cool the mushrooms when the mushrooms are respectively positioned in the plurality of conveying devices.

4. A system adapted to convey mushrooms, comprising:

a plurality of conveying devices for conveying individual mushrooms;

a first conveyor having a conveyor belt adapted to transport mushrooms between a loading zone for loading the mushrooms into respective conveying devices of the plurality of conveying devices and an unloading zone for unloading the mushrooms;

a second conveyor adapted to transport mushrooms from a mushroom growth chamber to the loading zone of the first conveyor;

a positioning gripper robot adapted to grasp a mushroom transported by the second conveyor and to position the mushroom in a conveying device of the plurality of conveying devices positioned on the first conveyor; and a camera configured for selecting mushrooms to be grasped by the positioning gripper robot, the selection being made based on at least one of a shape or a color of the cap of the mushrooms;

wherein a conveying device of the plurality of conveying devices for conveying an individual mushroom comprises:

a conveying body having a chamber intended to at least partially accommodate the mushroom, wherein the conveying body comprises an upper surface and a lower surface opposed to the upper surface;

the lower surface of the conveying body being configured to come into contact with the conveyor belt of the first conveyor so as to allow the conveying device of the plurality of conveying devices to be carried along by friction in order to provide individual conveying of the mushroom;

the upper surface of the conveying body comprising an orifice enabling insertion of the mushroom into the chamber, wherein an edge of the orifice defines an upper end of the chamber;

the chamber comprising an upper portion extending from the orifice of the upper surface of the conveying body towards the lower surface of the conveying body and being shaped to at least partially accommodate a cap of the mushroom; and the chamber comprising a lower portion extending from the upper portion of the chamber towards the lower surface of the conveying body and being shaped to accommodate a stem of the mushroom.

5. The system according to claim 4, wherein the first conveyor comprises a plurality of conveyor belts, at least some of the conveyor belts being associated with a mushroom size interval;

wherein the camera is also configured for determining respective sizes of mushrooms; and wherein the system further comprises a guide element configured to guide a conveying device of the plurality of conveying devices that holds a mushroom of a specific size determined by the camera towards a conveyor belt of the first conveyor being associated with a size interval that includes the specific size.

6. The system according to claim 4, wherein the second conveyor is a belt conveyor comprising a belt having orifices, each orifice of the belt accommodating a mushroom by inserting a stem of the mushroom into the orifice.

7. The system according to claim 4, further comprising a cooling device positioned between the loading zone and the unloading zone and adapted to cool the mushrooms when the mushrooms are respectively positioned in the plurality of conveying devices.

* * * * *